3,070,239
STOCK PUSHER
Gerald B. Lanphere, Syracuse, N.Y., assignor to Lipe-Rollway Corporation, Syracuse, N.Y., a corporation of New York
Filed July 31, 1958, Ser. No. 752,291
3 Claims. (Cl. 214—1.5)

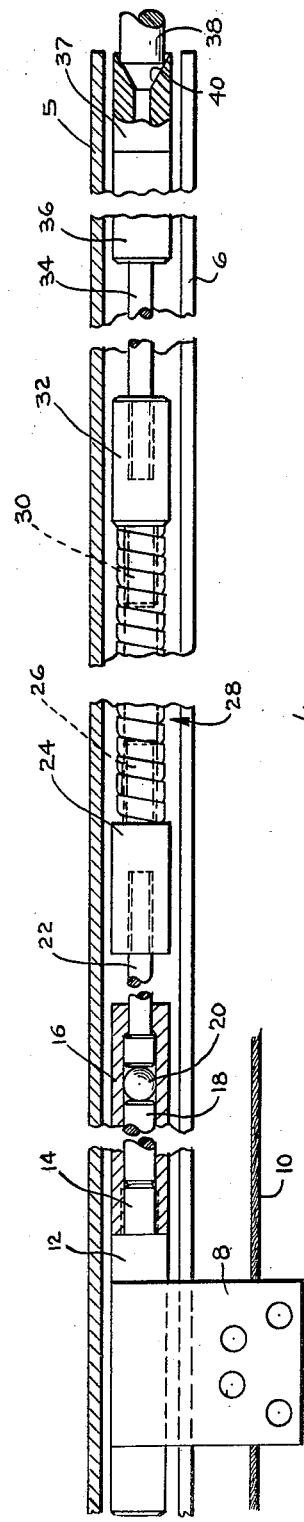

This invention relates to a stock bar pusher structure for stock feeding machines for use in connection with bar working machines. A stock bar pusher of this type is shown in Patent 2,681,498, issued on June 22, 1954, to B. C. Harney. It has been found in practice, in connection with stock bar pushers of the type disclosed in the patent, that when the stock bar is rotated by new and improved high speed bar working machines at speeds on the order of six thousand (6000) r.p.m. or higher that the vibrations set up in the stock bar caused overheating and resultant malfunctioning of the stock bar pusher structure.

Accordingly, it is an object of this invention to provide a new and improved stock bar pusher structure adapted to be used with bar working machines which rotate at high speeds wherein overheating of the stock bar pusher structure is eliminated.

The invention consists in the novel features and in the combinations and constructions hereinafter set forth and claimed.

In describing this invention, reference is had to the accompanying drawings in which like characters designate corresponding parts in all the views.

In the drawings:

FIGURE 1 is a fragmentary elevational view, with parts in section, of a bar feed guide tube having the new and improved stock pusher structure therein, and FIGURE 2 is an enlarged fragmentary elevational view, with parts broken away and parts in section, showing a portion of the pusher structure.

In FIGURE 1 the bar feed guide tube 5 is formed with a longitudinally extending slot 6 to receive a plate or flag 8 which is connected to a drive cable 10 by any suitable means. The inner end of the flag 8 is connected by suitable means to a piece of rod 12 formed at its forward end with a threaded portion 14. A tube 16 is threaded on the stud 14 and carries a spacer 18 and a ball thrust bearing 20 between the spacer 18 and a head formed on a rod 22, journaled for rotation in the forward end of the tube 16.

The rod 22 is threadedly connected to an adapter 24 which in turn is formed with a threaded shank 26 to connect to a tightly wound coil body, generally indicated at 28, to be hereinafter described in detail.

The forward end of the coil body 28 is in turn threadedly connected to a threaded shank 30 formed on a second adapter 32. The adapter 32 is threadedly connected at its forward end to a rod 34 which in turn is suitably received at its forward end in and connected to the rear portion 36 of a conventional stock bar pusher of the type disclosed, for example, in Patent 2,681,498, having a cup center portion 37 and the pusher is journaled for rotation on the rod 34 and may be provided with or without ejector mechanism as is desired. A stock bar 38 is received in the cup center 40 formed in the forward end of the portion 37.

As described in connection with Patent 2,681,498, the bar 38 is moved forwardly through the guide tube 5 and into the spindle of the bar working machine (not shown) by means of the flag 8 and the drive cable 10. In that patent the pusher 36 was connected to the tube 16 by means of a solid or rigid rod. In operation when such a pusher was used in connection with high speed bar working machines it was found that vibrations set up in the bar 38 passed through the pusher 36 and solid rod connection, and the magnitude of the frequency of the vibrations increased at the rear of the pusher. These vibrations caused overheating at the point of connection between the pusher 36 and the solid rod and such overheating caused the joint between the rod and the pusher to break or shear.

It was found that a tightly wound coil body if inserted between the pusher and the rod would act to absorb, dampen or otherwise reduce the vibrations transmitted by the pusher 36 from bar 38 to the point where such vibrations would not cause any overheating to the joint between the rod 22 and the adapter 24. The close or tightly wound coil body 28 as illustrated in FIGURE 2 was found in practice to be satisfactory in use through a wide range of bar speeds and bar feed guide tube sizes. It is to be understood, however, that other forms of close or tightly wound coil bodies may also be used as desired.

In FIGURE 2 it will be seen that the coil body 28 is composed of a plurality of tightly wound coils 50 which are approximately rectangular in cross section. Each of the coils 50 is formed with an overlying lip portion 52 which overlaps the adjacent coil so as to maintain the body 28 in a relatively rigid condition. As viewed in FIGURE 2 each of the coils 50 is formed with a concave forward portion 54 and a convex rearward portion 56 terminating in a lip 58 to provide the overlap between the adjacent coils.

In practice, when the bar 38 is rotated at high speeds by the bar working machine this rotation, and the consequent vibration is imparted to the assembly 36 and to the coil body 28 via rod 34 and adapter 32. Coil body 28 absorbs, dampens, or otherwise reduces this vibration so that the rotative connection between the rod 22 and the tube 16 does not overheat at the joints between the rod 22 and the adapter 24 or the tube 16.

Thus, it will be seen that by my invention I have provided a new and improved stock bar pusher structure which is economical to manufacture and which serves to eliminate harmful overheating in the stock bar pusher structure due to vibrations imparted to the structure by a rotating stock bar.

What I claim is:

1. A stock bar pusher structure for advancing stock bars through the bar guide tube of a stock bar feeding machine, said pusher structure comprising a power operated driving member mounted for reciprocation in the stock bar guide tube, a flexible tubular member connected at one end to said driving member for rotation relative thereto, a stock bar engaging head rotatably connected to the opposite end of said flexible member, said flexible member comprising the sole means of connection between said driving member and said stock bar engaging head and said flexible member being formed of closely wound abutting coils.

2. A stock bar pusher structure as defined in claim 1, wherein the coils of said flexible member are approximately rectangular in cross section.

3. A pusher structure as defined in claim 1, wherein the abutting side edges of the coils of said flexible member have overlying portions.

References Cited in the file of this patent

UNITED STATES PATENTS

| | | |
|---|---|---|
| 2,266,227 | Mall | Dec. 16, 1941 |
| 2,272,720 | Mariotte | Feb. 10, 1942 |
| 2,334,272 | Mariotte | Nov. 16, 1943 |
| 2,602,212 | Rosenberg | July 8, 1952 |
| 2,681,498 | Harney | June 22, 1954 |

OTHER REFERENCES

Mechanical Engineering Handbook, Kent, twelfth edition, Design and Production Volume, section 11, page 21, copyright 1950.